Dec. 11, 1962 G. L. AMACHER ETAL 3,067,934

CLOCK SIGNAL GENERATING MEANS

Filed May 15, 1961 4 Sheets-Sheet 1

INVENTORS
GENE L. AMACHER
JOHN F. PAUGSTAT

BY Louis A. Kline
Albert L. Sessler, Jr.
HIS ATTORNEYS

CLOCK SIGNAL GENERATING MEANS

Filed May 15, 1961 4 Sheets-Sheet 2

INVENTORS
GENE L. AMACHER
JOHN F. PAUGSTAT
BY Louis A Kline
Albert L Sessler Jr
HIS ATTORNEYS Dec. 11, 1962 G. L. AMACHER ETAL 3,067,934

CLOCK SIGNAL GENERATING MEANS

Filed May 15, 1961 4 Sheets-Sheet 3

INVENTORS
GENE L. AMACHER
JOHN F. PAUGSTAT

BY Louis A. Kline
Albert L. Sessler, Jr.
HIS ATTORNEYS

Dec. 11, 1962 G. L. AMACHER ETAL 3,067,934

CLOCK SIGNAL GENERATING MEANS

Filed May 15, 1961 4 Sheets-Sheet 4

INVENTORS
GENE L. AMACHER
JOHN F. PAUGSTAT

BY Louis A. Kline
Albert L. Sessler Jr.
HIS ATTORNEYS

United States Patent Office 3,067,934

Patented Dec. 11, 1962

3,067,934

CLOCK SIGNAL GENERATING MEANS

Gene L. Amacher and John F. Paugstat, Dayton, Ohio, assignors to The National Cash Register Company, Dayton, Ohio, a corporation of Maryland Filed May 15, 1961, Ser. No. 109,998

6 Claims. (Cl. 235—61.11)

This invention relates to signal generating means, and particularly to means for generating a clock signal which can be used in sampling data sensed from a record medium.

The present invention is particularly adapted to provide a clock signal for the sampling of data sensed from a perforated tape moved at high speed past a sensing station. However, its utility is not limited to such an apparatus, and many other possible uses are envisioned, such as, for example, in an apparatus for sensing punched cards or magnetic tape.

One problem which has arisen in the use of high speed paper tape sensing devices is that of erroneous reading during starting or stopping of the tape. This either may involve the generation of a number of spurious clock signals through flutter of the tape, or may involve the loss of information due to the omission of sensing of a character. Character sensing from the tape commonly takes place under control of a clock signal generated by sensing of the sprocket holes on the tape. This clock signal ideally causes data signals generated by data perforations in the tape to be sampled after said data signals have stabilized following their initial rise. However, during starting and stopping, tape skew and other deviations from proper tape movement can cause the clock signals to rise before the data signals has arisen, and the data sampling will thus provide an incorrect result. Also, stopping of the tape may be such that the tape flutters, causing a plurality of unwanted clock signals to be generated from a single sprocket hole.

It is to prevent these undesirable conditions that the present invention has been devised. Novel dual sensing means are provided to generate two initial clock signals, slightly displaced in time with respect to each other, for each data character to be sensed. These two temporally displaced signals are combined, through a novel circuit, to provide a single re-timed clock signal for sampling the data sensed from the tape. This novel circuit is effective to prevent the generation of unwanted clock signals if flutter of the tape takes place during stopping, and is also effective to prevent loss of a data character when tape is stopped too slowly. Such loss might otherwise take place if a clock signal were generated after the parent device utilizing the tape sensing mechanism had ceased to interrogate said mechanism, and had thus been effectively disconnected from it. The novel circuit of the present invention prevents generation of such a clock signal, and the associated data is therefore not lost, but is retained, and may be transmitted to the utilizing device at the beginning of the next run of tape movement. Because of this provision which prevents loss of a data character, the maximum permissible stopping distance for the tape actually exceeds the center-to-center distance between adjacent sprocket holes on the tape.

It is accordingly an object of the present invention to provide means, in a tape sensing mechanism, to prevent generation of unwanted clock signals.

Another object is to provide simple and efficient means for sensing data from a record member.

A further object is to provide means for sensing, from a perforation on a moving record medium, two clock signals which are temporally displaced with respect to each other, and which can be combined into a single re-timed clock signal.

An additional object is to provide signal generating means capable of producing a single retimed signal from a plurality of signals generated by sensing of a record medium.

Still another object is to provide means for generating a clock signal which may be used in the sampling of data signals.

With these and other objects, which will become apparent from the following description, in view, the invention includes certain novel features of construction and combinations of parts, a plurality of forms or embodiments of which are hereinafter described with reference to the drawings which accompany and form a part of this specification.

FIGS. 10 to 14 inclusive show a plurality of modified forms of sensing means to enable dual sensing of a perforation in the tape, for the production of a re-timed clock signal.

Figure 1:
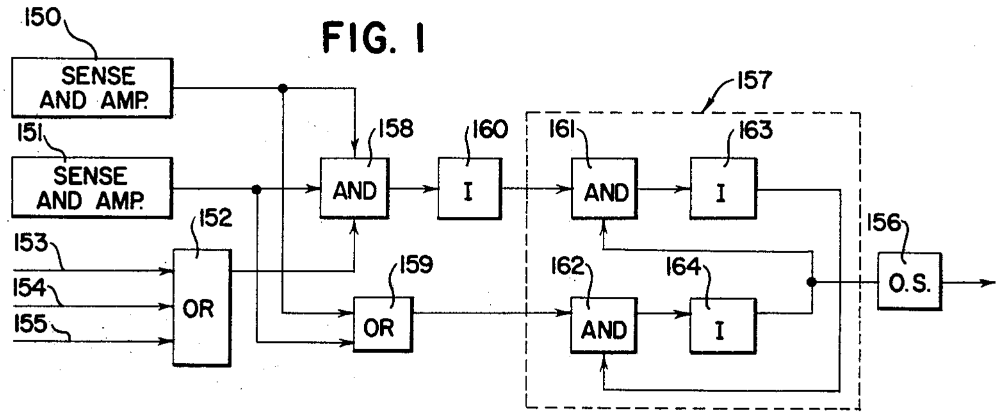
FIG. 1 is a logical block diagram of a clock signal generating system constructed according to the principles of the present invention.

Referring now to FIG. 1, the block diagram shown there includes a number of circuit elements, including photo-diode amplifiers, AND gates, OR gates, inverters and a mono-stable element, or "one-shot." An explanation will now be given of specific circuits which may be employed for the various elements referred to above. It should be understood, however, that many other types of circuits are available for performing the functions of these elements, and could be used, if desired, in the present invention. Also, the upper, or "true," and lower, or "false," logical levels of operation in the illustrated embodiment are 0 volts and minus 8 volts, respectively, but it should be understood that other logical levels could be employed if desired.

Figure 3:
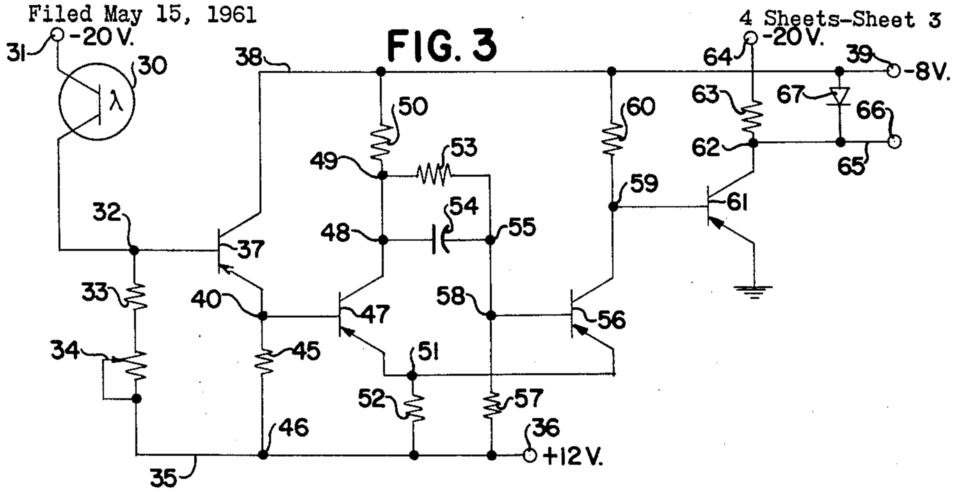
FIG. 3 is a schematic diagram of a photo-diode amplifier circuit which may be used in the block diagram of FIG. 1.

Shown in FIG. 3 is a schematic diagram of a photo-diode amplifier unit which may be used to sense the perforations in the record medium being sensed, and to develop signals therefrom. Two of these photo-diode amplifiers are used in the system illustrated in FIG. 1. The signal is sensed from the record medium by a photo-diode 30, which may be of type 1N2175, manufactured by the Texas Instruments Company. One terminal of the photo-diode 30 is connected to a terminal 31, to which is applied a source of minus 20 volts D.C. potential. The other terminal of the photo-diode 30 is connected to a point 32, from which two other branches extend. One of these two branches is connected over a 15,000-ohm resistor 33, a 100,000-ohm potentiometer 34, and a common 35 to a terminal 36, to which is applied a source of plus 12 volts D.C. potential. The other of these branches is connected to the base of a PNP transistor 37, the collector of which is connected to a common 38, which in turn is connected to a terminal 39, to which is applied a source of minus 8 volts D.C. potential. The emitter of the transistor 37 is connected to a point 40 from which two other branches extend.

A first one of these two branches is connected over a 20,000-ohm resistor 45 to a point 46 on the common 35. The other branch is directly connected to the base of a PNP transistor 47, the collector of which is connected over points 48 and 49, and a 2,700-ohm resistor 50, to the common 38; and the emitter of which is connected over a point 51 and a 1500-ohm resistor 52 to the common 35. A 36,000-ohm resistor 53 and a 4,000-micro-microfarad capacitor 54 are connected in parallel between the points 49 and 48, respectively, and a point 55, to which is also connected the base circuit of a PNP transistor 56. A 240,000-ohm resistor 57 is included in a circuit which extends between a point 58 in the base circuit of the transistor 56 and the common 35.

The emitter of the transistor 56 is connected to the point 51 which, it will be recalled, is also connected to the emitter of the transistor 47. The collector of the transistor 56 is connected over a point 59 and a 2,200-ohm resistor 60 to the common 38. Also connected to the point 59 is the base circuit of a PNP transistor 61, the emitter of which is connected to a base reference potential, shown here as ground, and the collector of which is connected over a point 62 and a 1100-ohm resistor 63 to a terminal 64 to which is applied a source of minus 20 volts D.C. potential. An output line 65 extends from the point 62 and terminates in an output terminal 66. A diode 67 is connected between the output line 65 and the common 38.

The mode of operation of the circuit of FIG. 3 will now be briefly described. As a perforation in the record medium passes the sensing station, the incident radiation on the photo-diode 30 is greatly increased, causing a large decrease in the internal resistance of said photo-diode. Due to the voltage-dividing action of the circuit extending between the terminals 31 and 36 and including the potentiometer 34, the resistor 33, the point 32 and the photo-diode 30, a negative-going signal is produced at the point 32 by illumination of the photo-diode 30. The magnitude of this signal is dependent upon the characteristics of the photo-diode 30 and the setting of the potentiometer 34, which is provided primarily to permit adjustment of resistance to compensate for variations in sensitivity of different photo-diodes, for variations in the intensity of the source of illumination, and for changes in the condition of the photo-diode 30 as it ages.

The negative-going signal on the point 32 is applied to the base of the transistor 37, which is connected as an emitter follower and functions as a current-gain device to provide a negative-going output signal from its emitter of sufficient strength to drive the transistors 47 and 56, which are connected to form, together with their associated circuitry, a well-known bistable device, commonly known as a Schmitt trigger.

The signal from the emitter of the transistor 37 is applied to the base of the transistor 47 of the Schmitt trigger. The transistor 47 is overdriven, and is effective to amplify and invert the signal which is applied to its base.

With the photo-diode 30 in a dark condition, and the potential at the base of the transistor 47 at a positive level, this transistor is in a non-conducting state. The transistor 56, whose emitter is coupled to the emitter of the transistor 47, is in a conducting state when the transistor 47 is non-conducting, and is in a non-conducting state when the transistor 47 is conducting.

When the photo-diode 30 is illuminated, as by the passing of a sprocket hole in the tape over the aperture in the sensing station associated with said photo-diode, the potential at the base of the transistor 47 swings negatively, and this transistor is rendered conducting. Potential on the collector of the transistor 47 accordingly swings in a positive direction, and the base of the transistor 56, which is coupled over the resistor 53 and the capacitor 54 to the collector of the transistor 47, changes correspondingly in potential. Similarly, at this time, the coupled emitters of the transistors 47 and 56 swing negatively in potential. At a given time, the transistor 56 is thereby rendered non-conducting.

Conversely, when illumination of the photo-diode 30 ceases, as by completion of travel of the perforation in the record medium across the sensing element, the potential at the base of the transistor 47 swings positively, and this transistor is rendered non-conducting. Potential of the collector of the transistor 47 then swings in a negative direction, as does the potential on the base of the transistor 56, which is coupled to the collector of the transistor 47. Also at this time, the coupled emitters of the transistors 47 and 56 swing positively in potential. At a given time, the transistor 56 is accordingly rendered conducting.

It will thus be seen that the trigger circuit shown in FIG. 3, including the transistors 47 and 56, is bi-stable, with one transistor conducting while the other is non-conducting. As a consequence of the inter-relation of the transistors 47 and 56, the output taken from the point 59 in the collector circuit of the transistor 56 has a square wave configuration, rather than the irregular form appearing at the point 32. In addition, the circuit including the two transistors 47 and 56 has a hysteresis or back-lash effect such that the wave form will remain square even though there are irregularities in the signal produced at the point 32, as, for example, when the signal drops to a lower level during the pulse, or when, in reading of a stop signal, the hole in the record medium is somewhat overshot before the tape is halted.

The signal from the point 59 is inverted and amplified by the transistor 61 in a conventional manner, and the output from the collector circuit of this transistor, taken at the point 62, is of a suitable amplitude to be used in the system shown in the logical diagram of FIG. 1. The connection of the output line 65 to the minus 8 volts source of potential over the diode 67 is provided to define the logical level, by preventing the voltage from becoming more negative than minus 8 volts. This also prevents damage to the transistor 61. The lower or "false" logical level appearing at the terminal 66, when the transistor 61 is not conducting, is therefore minus 8 volts, while the upper or "true" logical level appearing at the terminal 66, when the transistor 61 is conducting, is 0 volts.

Figure 4:
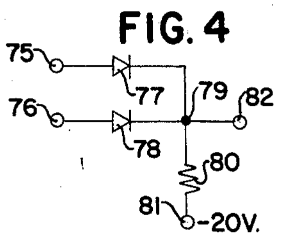
FIG. 4 is a schematic diagram of an "OR" circuit, which may be used in the block diagram of FIG. 1.

Shown in FIG. 4 is a schematic diagram of a logical OR circuit, which may be employed in the system shown in the block diagram of FIG. 1. Two input terminals 75 and 76 are connected to the anodes of a pair of corresponding diodes 77 and 78. The cathodes of these two diodes are connected to a common point 79, to which is also connected a terminal 81, over a 3000-ohm resistor 80. A source of minus 20 volts D.C. potential is applied to the terminal 81. In addition, an output terminal 82 is also connected to the point 79.

The manner in which the OR circuit of FIG. 4 functions will now briefly be described. So long as the signal levels on both of the two input terminals 75 and 76 remain at the lower logical level, which is minus 8 volts, the signal at the output terminal 82 will also be at the lower or "false" level of minus 8 volts. However when the level of the input signal on either or both of the terminals 75 and 76 rises to zero volts, this causes a corresponding rise in potential at the point 79. Said rise in potential also appears at the output terminal 82, which is then maintained at the upper or "true" level of zero volts, so long as this level is maintained on at least one of the input terminals 75 or 76.

Figure 5:
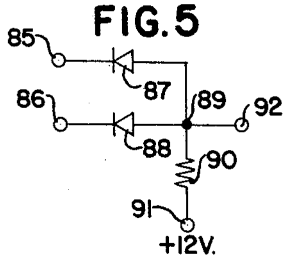
FIG. 5 is a schematic diagram of an "AND" circuit which may be used in the block diagram of FIG. 1.

Shown in FIG. 5 is a schematic diagram of a logical AND circuit which may be employed in the system shown in the block diagram of FIG. 1. A pair of input terminals 85 and 86 are connected to the cathodes of a pair of diodes 87 and 88 respectively. The anodes of these diodes are connected to a common point 89, to which is also connected, over a 24,000-ohm resistor 90, a terminal 91, to which is applied a plus 12 volts source of D.C. potential. An output terminal 92 is also directly connected to the point 89.

The mode of operation of the AND circuit of FIG. 5 will now be briefly described. So long as a negative signal level is maintained on either or both of the input signal terminals 85 and 86, a path is provided for current flow from terminal 91 through either or both of the diodes 87 and 88 to either or both of the terminals 85 and 86. As a result the potential on the point 89, and therefore the potential on the output terminal 92, will remain at approximately minus 8 volts, the lower or "false" logical level. However, when a positive signal level of zero volts is applied to both of the terminals 85 and 86, the potential at the point 89, and therefore at the output terminal 92, will also be zero volts, which is the upper or "true" logical level.

Figure 6:
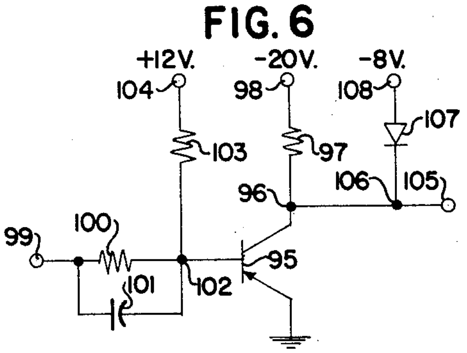
FIG. 6 is a schematic diagram of an inverter circuit which may be used in the block diagram of FIG. 1.

Shown in FIG. 6 is a schematic diagram of an inverter circuit which may be employed in the system shown in the block diagram of FIG. 1. This circuit includes a PNP transistor 95, the emitter of which is connected to a base reference potential, shown here as ground, and the collector of which is connected over a point 96 and a 2200-ohm resistor 97 to a terminal 98, to which is applied a source of minus 20 volts D.C. potential. An input terminal 99 is connected over a parallel combination of a 3900-ohm resistor 100 and a 240-micromicrofarad capacitor 101, and over a point 102, to the base of the transistor 95. The point 102 is also connected over a 43,000-ohm resistor 103 to a terminal 104, to which is applied a source of plus 12 volts D.C. potential. An output terminal 105 is connected over a point 106 to the point 96 in the collector circuit of the transistor 95. Connected to the point 106 over a diode 107 is a terminal 108 to which is applied a source of minus 8 volts D.C. potential.

The mode of operation of the inverter of FIG. 6 will now be briefly described. When a negative input signal at the lower logical level is applied to the terminal 99, said signal is transmitted over the network comprising the resistor 100 and the capacitor 101 to the base of the transistor 95, and causes said transistor to conduct. This results in a rise of potential on the collector circuit to the upper logical level of approximately zero volts. Since the output terminal 105 is connected to the point 96 on the collector circuit, its potential at this time is also approximately zero volts, the upper or "true" logical level. Conversely, when an input signal at the upper logical level of zero volts is applied to the terminal 99, this causes the transistor 95 to be cut off. Potential on the collector circuit moves toward minus 20 volts but is held at the lower or "false" logical level of minus 8 volts by the diode 107 connected to the minus 8 volts potential at the terminal 108.

Figure 7:
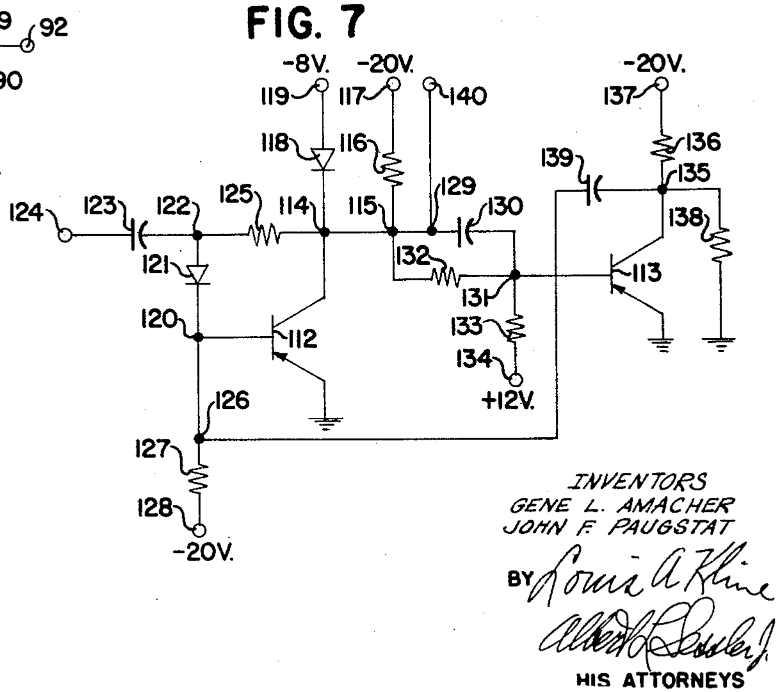
FIG. 7 is a schematic diagram of a monostable element, also known as a "one shot," which may be used in the diagram of FIG. 1.

Shown in FIG. 7 is a schematic diagram of a monostable type multi-vibrator, or "one-shot," which may be employed in the system illustrated in the block diagram of FIG. 1. This circuit includes two PNP transistors 112 and 113. The emitter of the transistor 112 is connected to a base reference potential, shown here as ground, and the collector of said transistor is connected over a point 114, a point 115, and a 1000-ohm resistor 116 to a terminal 117, to which is applied a source of minus 20 volts D.C. potential. The point 114 is connected over a diode 118 to a terminal 119, to which is applied a source of minus 8 volts D.C. potential. The base of the transistor 112 is connected over a point 120, a diode 121, a point 122 and a 1000-micromicrofarad capacitor 123 to an input terminal 124. The point 114 is also connected to the point 122 over a 4700-ohm resistor 125. The point 120 is connected over a point 126 and an 8200-ohm resistor 127 to a terminal 128, to which is applied a source of minus 20 volts D.C. potential.

A connection from the point 115 on the collector circuit of the transistor 112 to the base of the transistor 113 extends over a point 129, a 330-micromicrofarad capacitor 130 and a point 131. The point 129 and the capacitor 130 are paralleled by a 3900-ohm resistor 132 which is connected between the points 129 and 131. A further connection is provided from the point 131 over a 43,000-ohm resistor 133 to a terminal 134 to which is applied a source of plus 12 volts D.C. potential. The emitter of the transistor 113 is connected to a base reference potential, shown here as ground, and the collector is connected over a point 135 and a 1000-ohm resistor 136 to a terminal 137 to which is applied a source of minus 20 volts D.C. potential. Also from the point 135, one path extends over an 820-ohm resistor 138 to a base reference potential, shown here as ground. Another path extends from the point 135 over a 22,000-micromicrofarad capacitor 139 to the point 126 in the base circuit of the transistor 112. An output terminal 140, on which an output signal from the circuit of FIG. 7 appears, is connected to the point 129.

The mode of operation of the monostable multivibrator of FIG. 7 will now be briefly described. In the stable state of this device, the transistor 112 is conducting, the transistor 113 is non-conducting, and the output signal on the terminal 140 is at the upper or "true" logical level of zero volts. The circuit of FIG. 7 is triggered by the rise to a "true" logical level of zero volts of an input signal on the terminal 124. This signal is conducted over the point 122, the diode 121 and the point 120 to the base of the transistor 112, and renders said transistor non-conducting. A negative-going potential change on the collector circuit of the transistor 112 results from its being rendered non-conducting, and this negative-going signal is applied over the point 129 and the paralleled resistor 132 and the capacitor 130 to the base of the transistor 113 to render it conducting.

The output signal on the terminal 140, which is connected to the point 129, thus swings from the upper or "true" logical level of zero volts to the lower or "false" logical level of minus 8 volts, at which level it is held, due to the clamping action of the diode 118.

As the transistor 113 begins conducting, the potential on the collector circuit of said transistor swings from approximately minus 8 volts to approximately zero volts, and the capacitor 139 which, it will be recalled, is connected between the collector circuit of the transistor 113 and the base circuit of the transistor 112, begins to charge. The time required for the capacitor 139 to charge is, of course, determined by the values of said capacitor and the resistor 127. During the time that the capacitor 139 is charging, the transistor 112 remains in a non-conducting condition, the transistor 113 continues to conduct, and the logical level on the output terminal 140 remains at the lower or "false" level of minus 8 volts.

As charging of the capacitor 139 is completed, the potential on the points 120 and 126 swings negatively, and the transistor 112 is rendered conducting once more, independently of the value of the signal appearing on the input terminal 124. Conduction of the transistor 112 causes the potential on its collector circuit to swing to approximately zero volts. The signal on the output terminal 140 responds to this and swings to the upper or "true" logical level of zero volts. Similarly, this voltage swing is applied to the base of the transistor 113 and renders said transistor non-conducting. The circuit of FIG. 7 has thus been returned to a stable condition, in which it will remain until the next positive-going signal appears on the input terminal 124. It will, of course, be seen that the duration of the negative signal on the output terminal 140 is dependent upon the RC time constant of the circuit, as determined by the values of the resistor 127 and the capacitor 139.

Referring now to the block diagram of FIG. 1, it will be seen that two sensing and amplifying circuits 150 and 151, which may be of the type shown in FIG. 3, are provided for sensing sprocket holes or other regularly spaced perforations in the record medium. The manner in which the photo-diodes of these two circuits are physically arranged in the sensing station to enable said circuits to produce timing signals which are temporally displaced with respect to each other will subsequently be described.

Also shown in FIG. 1 is an OR gate 152, which may be of the general type shown in FIG. 4, except that an extra input branch, including a diode, is provided to accommodate three input lines 153, 154, 155, to the OR gate. These lines carry various control signals for controlling the system represented by the diagram of FIG. 1, in coordination with other devices with which said system is associated. These control signals may, for example, include a "read" signal, a "rewind" signal and a "black space" signal, respectively, on the three lines 153, 154 and 155.

The clock signals which are the output of the system of FIG. 1 are generated by a monostable multivibrator, or "one-shot," 156, which may be of the type shown in FIG. 7. Input to the "one-shot" 156 is furnished by a bistable element, or "flip-flop," shown generally at 157.

Figure 2:
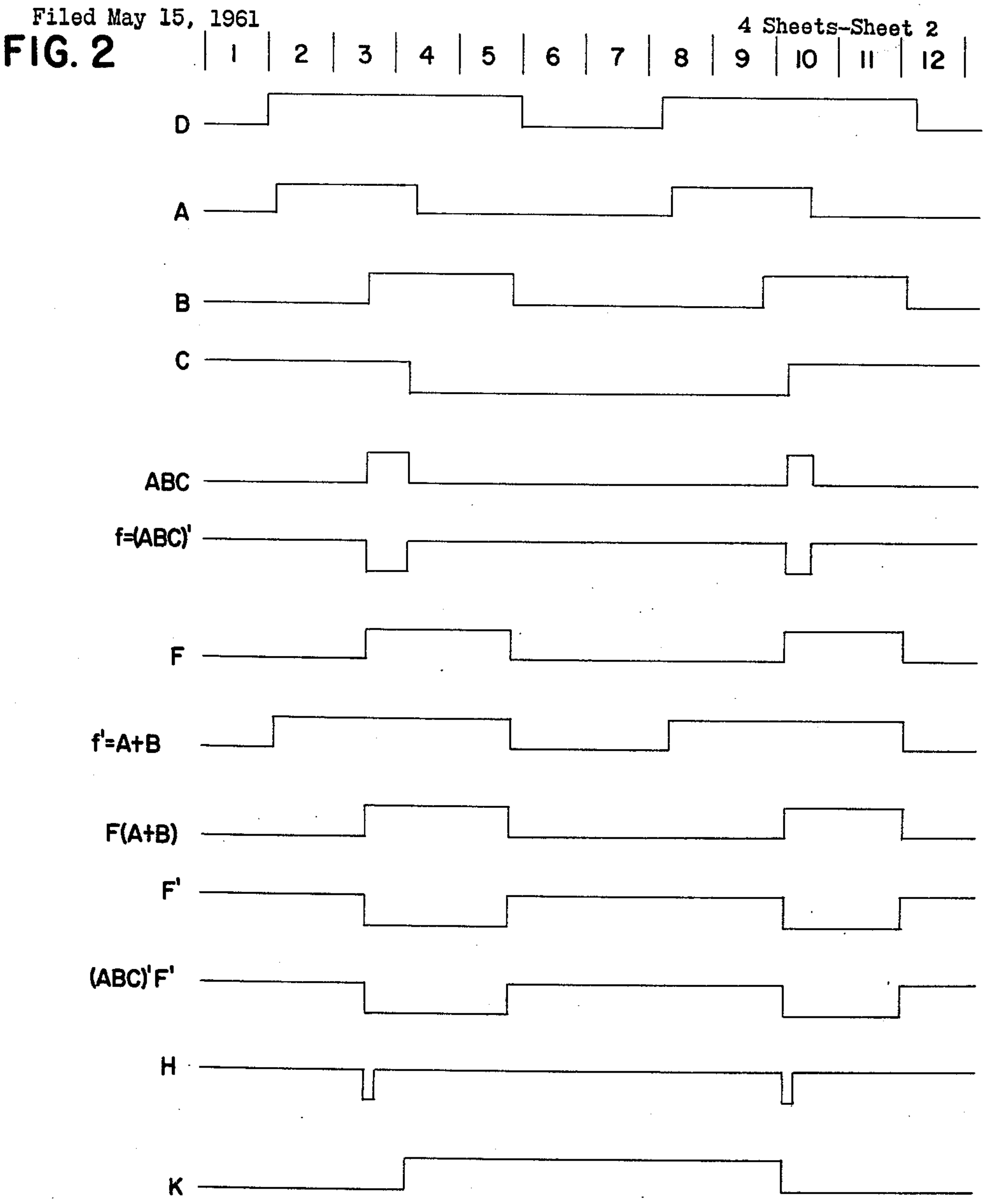
FIG. 2 shows a plurality of wave forms associated with various elements of the system shown in the diagram of FIG. 1.

The two inputs to the "flip-flop" 157 are supplied with signals derived from predetermined combinations of the various inputs to the system of FIG. 1, according to the following Boolean expressions:

$$f=(ABC)'$$

and $$f'=A+B$$

where $f$ represents a first input to the "flip-flop" 157; $f'$ represents a second input to the "flip-flop" 157; A represents an output signal from the sensing and amplifying circuit 150; B represents an output signal from the sensing and amplifying circuit 151; and C represents an output signal from the OR gate 152. The wave forms of the signals A, B, C, $f$ and $f'$ are shown in FIG. 2.

One means for implementing the above Boolean expressions is shown in FIG. 1, and utilizes AND gate 158, which may be of the type shown in FIG. 5, OR gate 159 which may be of the type shown in FIG. 4, and an inverter 160, which may be of the type shown in FIG. 6.

The outputs from the two sensing and amplifying circuits 150 and 151 are connected as inputs to the AND gate 158, and a further input to the AND gate 158 is furnished by the output of the OR gate 152. The output signal from the AND gate 158 is applied to the inverter 160, and appears in inverted form on the output of the inverter 160.

In a simplified version of the present invention, the output of the AND gate 158 may be utilized as a clock signal for control of other apparatus, if desired. In such a case, only the outputs of the sensing and amplifying circuits 150 and 151 are applied to the AND gate 158, so that the output of said gate, which may be utilized as a clock signal, is the logical product of the two temporally displaced timing signals generated by the circuits 150 and 151. This simplified system of course lacks the versatility of the complete system shown in FIG. 1 since it contains no provision for control over the generation of a clock signal by a control signal such as is produced by the OR gate 152 in FIG. 1.

In the system of FIG. 1, the outputs from the sensing and amplifying circuits 150 and 151, in addition to being applied to the AND gate 158, are also applied to the OR gate 159 to furnish the inputs for that gate.

The two inputs to the flip-flop 157 are thus provided by the output of the AND gate 158, as inverted by the inverter 160, and by the output of the OR gate 159. As previously described, the output of the flip-flop 157 is connected to the monostable multivibrator, or "one-shot" 156, the output of which furnishes the clock signal which the system represented by the block diagram 50 of FIG. 1 is designed to produce. However, it is obvious that, if desired, the output of the flip-flop 157 may, itself, be used as a clock signal, thus eliminating the need for the "one-shot" 156 which, when used, provides a clock signal of relatively narrow width. Alternatively, some other signal translating device might be used in place of the "one-shot" 156 to provide a clock signal having wave form characteristics desired for a particular application.

Any one of a number of conventional, well-known bistable elements, or "flip-flops" may be used to produce the output signal which is applied to the input of the "one-shot" 156, under control of the output from the AND gate 158, as inverted by the inverter 160, and under control of the OR gate 159. Shown in FIG. 1 is a "flip-flop" constructed by combining two AND gates 161 and 162 and two inverters 163 and 164.

The AND gates may be of the type shown in FIG. 5, and the inverters may be of the type shown in FIG. 6. The AND gate 161 derives one of its inputs from the output of the AND gate 158, as inverted by the inverter 160, and derives the other of its inputs from the output of the inverter 164, which inverts the output of the AND gate 162. Output of the AND gate 161 is applied to the inverter 163. The resulting inverted signal constitutes the output of the "flip-flop" 157, and is also applied as one of the inputs to the AND gate 162, the other input of which is taken from the output of the OR gate 159. The output of the AND gate 162 is inverted by the inverter 164 and then applied as one of the inputs to the AND gate 161, as previously described. This arrangement of AND gates 161 and 162, and inverters 163 and 164, is one means by which a "flip-flop" 157, having the desired characteristics for use in the system represented by the diagram of FIG. 1, can be realized.

The mode of operation of the system shown in the block diagram of FIG. 1 will now be briefly described, with the aid of the various wave forms shown in FIG. 2. These wave forms are arranged vertically, in order that their time relationship may readily be ascertained. For convenience in referring to the diagram of FIG. 2, a scale of time intervals from zero to 12 appears across the top of the figure. When reference to a particular time interval is made, it will hereafter be referred to with respect to this scale, as for example T1, T2, etc. All of the wave forms are shown at one of the two previously described logical levels on which the system operates.

As previously stated, the wave forms A and B represent the output signals from the sensing and amplifying circuits 150 and 151, while the wave form C represents the output signal from the OR gate 152.

The wave form D represents signals derived from the information or data channels on the record medium being sensed, and is included to show the time relationship of these signals with the signals produced by the various components of the system of FIG. 1.

The wave form ABC represents the output signal from the AND gate 158 of FIG. 1.

The wave form (ABC)′ represents the output signal from the inverter 160 of FIG. 1, and is also equal to, or represents, the input $f$ to the bistable element 157.

The wave form F represents the output signal from the bistable element 157, which in FIG. 1 is the output signal from the inverter 163.

The wave form A+B represents the output signal from the OR gate 159, which is also the input $f'$ to the bistable element 157.

The wave form $F(A+B)$ represents the output signal from the AND gate 162, which forms a part of the bistable element 157.

The wave form F′ represents the output signal from the inverter 164, which is one of the components of the bistable element 157.

The wave form (ABC)′F′ represents the output signal from the AND gate 161, which is one of the components of the bistable element 157.

The wave form H represents the output signal from the monostable multivibrator or "one shot" 156, and is the output from the system of FIG. 1.

The wave form K represents a stop signal which may be applied to a device in which the system of FIG. 1 is utilized. This wave form is included herein in order to show the relationship of the stop signal to the other wave forms derived from various components of the system of FIG. 1.

As may be seen in FIG. 2, during a normal tape sensing operation, the data signals from the tape for a given row of data perforations, represented by wave form D, rise to the upper logical level at the end of time T1, while the first timing signal, represented by wave form A, derived from the corresponding tape sprocket hole, rises shortly after the beginning of time T2, and the second timing signal, represented by wave form B, derived from that same sprocket hole, rises during time T3. Wave form A falls to the lower logical level during time T4, and wave form B falls during time T5, while the data wave form D does not fall until the end of time T5.

Therefore, during continuous reading, the output of the OR gate 159, represented by the waveform $A+B$, rises at the time of rise of wave form A and falls at the time of fall of wave form B. The output of the AND gate 158, represented by the waveform ABC, rises at the time of the rise of wave form B and falls at the time of the fall of wave form A, since the wave form C remains at the "true" logical level so long as the "read" signal on the input 153 to the OR gate 152 remains "true." Of course, when there is no "true" input on any of the inputs 153, 154 or 155 of the OR gate 152, the output from that gate goes "false," and the output of the AND gate 158 accordingly goes "false" also.

During the sample time period shown in FIG. 2, the wave form C, representing the output of the OR gate 152, goes "false" soon after the beginning of time T4, and the output of the AND gate 158, represented by wave form ABC, accordingly also goes "false" at that time. As has been previously described, the output of the inverter 160 is the inverse of the output of the AND gate 158, and therefore the output of said inverter, represented by the wave form (ABC)′ goes "true" at the time, during period T4, when the output ABC of the AND gate 158 goes "false." The output of the inverter 160, which goes "false" during time T3, constitutes one of the inputs to the AND gate 161 which forms a part of the bistable element 157, as has been previously described. The other input to the AND gate 161 is the output of the inverter 164, represented by the wave form F′.

The output of the AND gate 161 goes "false" during time T3, as may be seen by examination of the wave form (ABC)′F′ of FIG. 2. This signal is inverted by the inverter 163 which also forms part of the bistable element 157. The output of the inverter 163 is represented by wave form F of FIG. 2, which also constitutes the output of the bi-stable element 157, as may be seen in FIG. 1. This rise in the output F of the bistable element 157 causes the "one-shot" 156 to produce a negative-going signal, as previously described in connection with the explanation of FIG. 7, and as shown by the wave form H. This signal remains negative for a predetermined time and then returns to a "true" logical level, as previously described. It will be noted in FIG. 2 that the negative-going signal H from the "one-shot" 156, which furnishes the clock signal output of FIG. 1, takes place during the time when the data signal D is at its "true" logical level, and after ample time has been allowed for the signal D to stabilize. This minimizes likelihood of erroneous reading of data signals.

In order for another output signal to be generated by the "one-shot" 156, the output F from the bistable element 157 must first return to its "false" logical level and then must make another rise to its "true" logical level. The return of the wave form F to its "false" logical level is caused by fall of the second timing signal, represented by wave form B. This fall causes the fall of the output from the OR gate 159, which in turn causes the fall of the output signal represented by the wave form $F(A+B)$ of the AND gate 162. The output signal of the AND gate 162 is inverted to a "true" level by the inverter 164, and is applied to the AND gate 161, where it causes the output signal represented by wave form (ABC)′F′ to rise to a "true" level, since the other input (ABC)′ to the AND gate 161 is also at a "true" level at this time, having risen to said "true" level during time T4. It will be recalled that the output signal represented by wave form F of the bistable element 157 is the inverse of the output signal of the AND gate 161, and the wave form F accordingly falls to a "false" logical level when the output of the AND gate 161 rises to a "true" logical level.

During normal reading, the wave form F remains at a "false" level until the wave form B rises again. If, however, in the meantime, a stop signal represented by wave form K has been generated by a utilizing device, and the control signal represented by wave form C has fallen to a "false" level, as shown in sample wave forms of FIG. 2, then the wave form F cannot rise to a "true" logical level again until the control output signal represented by the wave form C from the OR gate 152 rises to a "true" logical level once more.

In the sample wave forms of FIG. 2, the stop signal represented by the wave form K is shown rising to a "true" logical level during time T4 and the control signal represented by the wave form C is shown falling to a "false" logical level during the time T4. The system of FIG. 1 prevents generation of another output signal from the "one-shot" 156 until the control signal represented by the wave form C rises once more to a "true" logical level. This happens during time T10, and the stop signal represented by the wave form K simultaneously falls to the "false" logical level at this time. The output signal from the bistable element 157 represented by the wave form F then rises to the true logical level again, during time T10, and another output signal, represented by the wave form H, is generated by the "one shot" 156, during time T10, as a result of said rise.

A number of different physical arrangements may be utilized to accomplish the dual sprocket hole sensing which is necessary for functioning of the clock signal generating system of FIG. 1.

Figure 8:
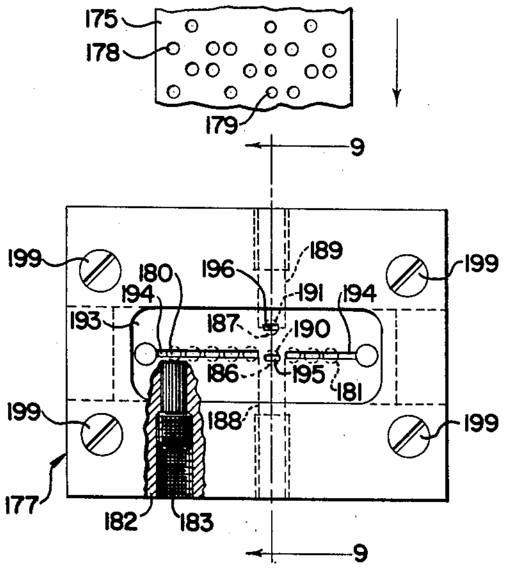
FIG. 8 is a top view of a tape sensing station, showing the dual sensing means for sensing the sprocket holes of the tape.
Figure 9:
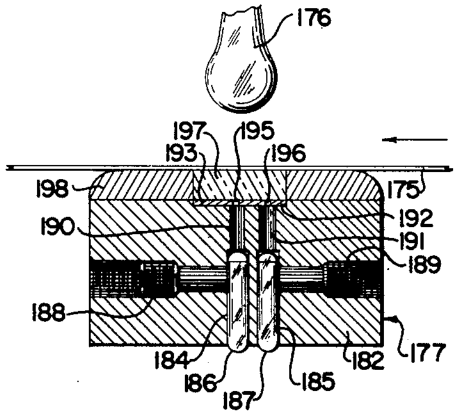
FIG. 9 is a sectional view, taken along line 9—9 of FIG. 8.

One such arrangement is shown in FIGS. 8 and 9, wherein a perforated paper tape 175 passes between an illumination source 176 and a sensing station shown generally at 177, on which the tape 175 rides.

The present invention may be used in connection with the sensing of any type of perforated paper tape. In the illustrated embodiment, the tape 175 is an eight-channel tape, having eight rows in which perforations 178 may be made for representation of information, and also including a row of sprocket holes 179 which are provided to enable the tape to be driven, and which, in addition, provide means for generation of clock signals.

Since the tape to be sensed contains eight channels of information, eight photo-diodes 180 are provided for sensing the respective channels, and are mounted in bores 181 in a diode block 182. A plurality of retaining means 183, which may be in the form of threaded rod-like element, are provided for holding the diodes 180 in proper position. Also mounted in the block 181 in a pair of bores 184 and 185 are two diodes 186 and 187, respectively, for sensing of the sprocket holes 179 in the tape 175. Retaining means 188 and 189, which may be in the form of threaded rod-like elements, are provided for retaining the diodes in proper position, and the extensions 190 and 191 of the bores 184 and 185 permit radiation to be transmitted to the diodes 186 and 187.

A transverse recess 192 is provided across that portion of the top of the diode block 182 in which the bores for the various diodes 180, 186 and 187 are located.

Said recess is shaped to accommodate a plate 193 which is provided with slots 194 extending across the bores 181 leading to the diodes 180, and is also provided with slots 195 and 196 extending across the extensions 190 and 191 of the bores 184 and 185 leading to the diodes 186 and 187. The plate 193 is in turn covered by a transparent dust cover 197, which, together with a diode block cover 198, secured to the block 182 by screws 199, forms a surface on which the tape 175 rides.

As the tape 175 passes over the sensing station 177 in the direction indicated by the arrows in FIGS. 8 and 9, the diodes 180 are so located as to be able to distinguish between perforated and unperforated positions in the various data channels on the tape. Similarly, the diodes 186 and 187 respond to illumination provided at regular intervals as the sprocket holes 179 pass between said diodes and the illumination source 176.

Examination of FIG. 8 discloses that the center of the extension 190 of the bore 184 for the diode 186 is slightly offset with respect to the centers of the bores 181 for the data sensing diodes 180. Further, it will be noted that the center of the extension 191 of the bore 185 for the diode 187 is spaced from the center of the extension 190 a distance which is slightly greater than the distance between centers of adjacent sprocket holes 179 in the tape 175. In fact, in the case wherein the centers of the tape sprocket holes 179 are 0.1 inch apart, the center of the extension 189 of the bore 184 is offset in one direction a distance of 0.012 inch from a line through the centers of the bores for the data sensing diode, while the center of the extension 191 of the bore 185 is offset in the opposite direction a distance of 0.112 inch from said line. There is thus a distance of 0.124 inch between centers of the bores 190 and 191.

Since a sprocket hole 179 is situated at regular 0.1-inch intervals along the tape 175, illumination from the source 176 passes through adjacent sprocket holes, and the extensions 190 and 191 of the bores 184 and 185, to impinge on the photo-diodes 186 and 187 in such a time relation as to produce the overlapping timing signal illustrated by wave forms A and B in FIG. 2. The same overlapping of wave forms A and B can be achieved by locating the photo-diodes 186 and 187 to sense a single sprocket hole rather than two adjacent holes. However, such an arrangement is not feasible using the configuration of parallel extensions 190 and 191 of the bores 185 and 184 shown in FIGS. 8 and 9, because of physical space limitations, and the same effect is achieved by sensing adjacent sprocket holes.

In FIGS. 10, 11, 12, 13, and 14, a number of embodiments of sensing stations are shown in which dual sensing of a single sprocket hole is provided. These embodiments have some advantages over the embodiment of FIGS. 8 and 9, since any possible inaccuracy due to variation and spacing of sprocket holes is eliminated. The wave forms A and B produced by the dual sensing means shown in the embodiments of FIGS. 10, 11, 12, 13, and 14 are, however, substantially the same as those produced by the means shown in the embodiment of FIGS. 8 and 9.

Figure 10:
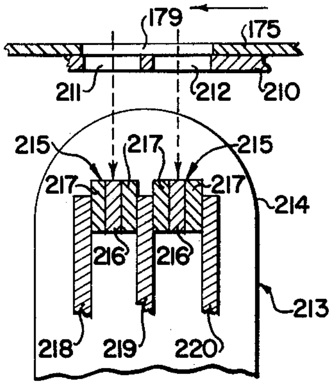

In the enlarged view of FIG. 10, the tape 175, having a sprocket hole 179 therein, passes over a plate 210, in which are two apertures 211 and 212. Positioned beneath the plate 210 is an electrical component 213, enclosed in a transparent envelope 214 and consisting of two individual photo-diode elements 215. Each element 215 includes a layer of light-sensitive "p" type material 216 sandwiched between two layers of "n" type material 217. Both the "p" and "n" type materials are similar to the materials employed in conventional single photo-diode elements. Electrical connections 218, 219, and 220 are provided to enable the elements 215 to be connected into circuits such as the sensing and amplifying circuit shown in FIG. 3, for detection of tape perforations and generation of signals therefrom.

In operation, as the leading edge of a perforation 179 in the tape 175 passes over the slots 211 and 212 in the plate 210, radiation passes from an illumination source through the perforations 179, the slots 211 and 212, and the transparent envelope 214, and will impinge on the elements 215 of the component 213, as shown by the dashed-line arrows. Assuming that the direction of movement of the tape 175 is from right to left, as indicated by the solid-line arrow in FIG. 10, the photo-diode 215 beneath the slot 212 will first be illuminated, followed by the photo-diode 215 beneath the slot 211. Illumination of the photo-diode beneath the slot 212 will continue until after illumination of the photo-diode under the slot 211 has commenced. Passage of the trailing edge of the aperture 179 over the plate 210 will subsequently cut off illumination, first through the slot 212, and then through the slot 211. Thus the same type of overlapping wave forms A and B (FIG. 3) are produced by the embodiment of FIGS. 10, as are produced by the embodiment of FIGS. 8 and 9.

Figure 11:
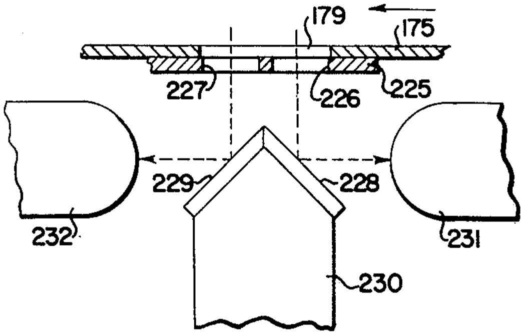

In the enlarged view of FIG. 11, a plate 225 is provided, having slots 226 and 227. The tape 175, having a sprocket hole 179 therein, passes over said plate from right to left in the direction of the solid-line arrow. Centered beneath the slots 226 and 227 is a support 230 having two reflective surfaces, or mirrors 228 and 229 located at the upper end thereof, and being arranged at the proper angles to reflect radiation which passes through the slots 226 and 227 to a pair of photo-diodes 231 and 232. The two radiation paths through the aperture 179 and the slots 226 and 227 are shown in dashed lines. It may readily be seen that as the tape 175 moves from right to left on the plate 225, overlapping wave forms A and B will be generated by the photo-diodes 231 and 232 respectively.

Figure 12:
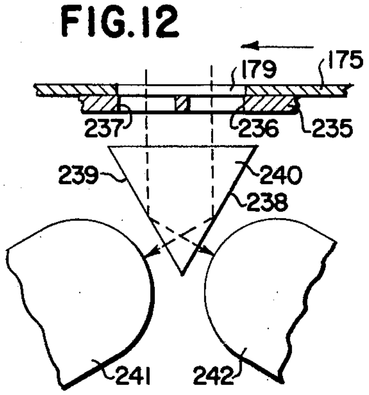

In the enlarged view of FIG. 12, the tape 175, having a sprocket hole 179 therein, is shown passing over a plate 235 in which are two apertures 236 and 237. Centrally positioned below the plate 235 with respect to the apertures 236 and 237 is a prism 240 of triangular cross-section, with one apex pointing downward. Surfaces 238 and 239 of the prism 240 are positioned so as to direct radiation in paths shown in dashed lines, which pass through the aperture 179 in the tape 175, and through the apertures 236 and 237, to photo-diodes 241 and 242, respectively.

In this embodiment, as in previous embodiments, it may be seen that passage of the tape 175 in a direction from right to left of FIG. 12 will produce wave forms such as are shown at A and B in FIG. 3, as the aperture 179 passes over the apertures 236 and 237, respectively.

Figure 13:
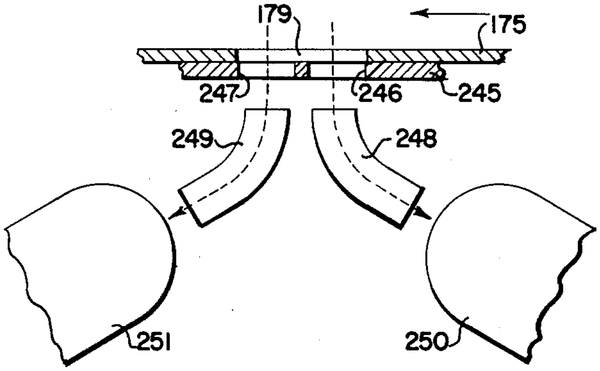

In the enlarged view of FIG. 13, the tape 175, having an aperture 179 therein, is shown passing in a direction from right to left over a plate 245 in which are located apertures 246 and 247. A pair of curved "light pipes" or light conducting rods 248 and 249 are positioned beneath the apertures 246 and 247, and are of such configuration as to direct radiation in paths shown in dashed lines, which pass through the slots 246 and 247 to impinge on photo-diodes 250 and 251 respectively.

Here again, it will be seen that, as the aperture 179 in the tape 175 moves from right to left over the plate 245, overlapping wave forms A and B, as shown in FIG. 3, will be produced by the impinging of radiation on the photo-diodes 250 and 251.

Figure 14:
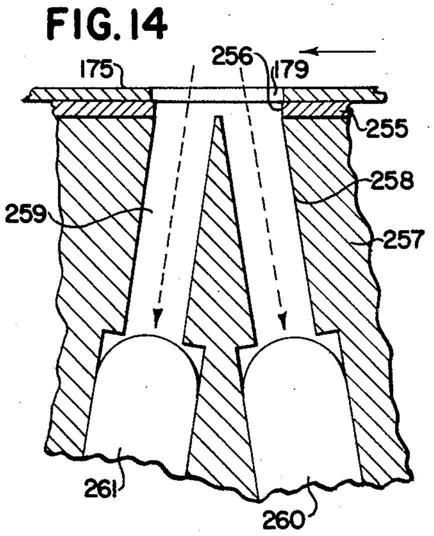

The embodiment shown in the enlarged view of FIG. 14 is somewhat similar to the embodiment shown in FIGS. 8 and 9, except that in FIG. 14 diverging bores are utilized to enable sensing to take place from a single sprocket hole, rather than a pair of sprocket holes. In this embodiment, the tape 175, having an aperture 179 therein, passes from right to left over a plate 255 having an aperture 256 therein. The plate 255 is supported on a diode block 257, in which are located two diverging bores 258 and 259, having lower enlarged portions to receive photo-diodes 260 and 261. Radiation is thus permitted to pass from a source (not shown), in paths shown in dashed lines, through the aperture 179 in the tape 175, the aperture 256 in the plate 255, and the bores 258 and 259, to impinge on the photo-diodes 260 and 261. This results in the generation of overlapping wave forms, such as those shown in A and B in FIG. 3.

It will thus be seen that a plurality of alternative constructions have been shown and described whereby dual wave forms may be generated from the sprocket holes of paper tape being sensed. These dual wave forms may be utilized in the novel system represented by the block diagram of FIG. 1 to produce a clock signal having the desired characteristics for minimizing errors in sensing of the tape.

While the forms of mechanism shown and described herein are admirably adapted to fulfill the objects primarily stated, it is to be understood that it is not intended to confine the invention to the forms or embodiments disclosed herein, for it is susceptible of embodiment in various other forms.

What is claimed is:

1. A device for producing clock signals from a record medium being sensed, comprising, in combination, first and second sensing means capable of sensing the presence of regularly spaced timing apertures in said record medium and producing timing signals in response to the apertures sensed;

a first OR gate capable of producing a "true" output control signal for controlling the operation of the device, in response to a "true" input signal on any one of a plurality of individual control signal input means;

a first AND gate capable of producing a "true" output signal in response to a coincident input of "true" signals from the two sensing means and a "true" signal from the first OR gate;

a first inverter for inverting the output signal of the first AND gate;

a second AND gate capable of producing a "true" output signal in response to a coincident input of a "true" signal from the first inverter and an additional "true" signal;

a second inverter for inverting the output signal of the second AND gate;

a second OR gate capable of producing a "true" output signal in response to a "true" input signal from either of the two sensing means;

a third AND gate capable of producing a "true" output signal in response to a coincident input of a "true" signal from the second OR gate and a "true" signal from the second inverter;

a third inverter for inverting the output of the third AND gate, the output of said third inverter being applied to the second AND gate to provide said additional "true" signal;

and a monostable element having its input connected to the output of the second inverter, said monostable element providing a clock signal in response to a signal change to "true" on its input, whereby a clock signal is produced by said monostable element in response to a predetermined combination of control signal and timing signals.

2. A device for producing clock signals from a record medium being sensed, comprising, in combination, first and second sensing means capable of sensing the presence of regularly spaced timing apertures in said record medium and producing timing signals in response to the apertures sensed;

control means to provide a control signal for controlling the operation of the device;

a first AND gate capable of producing an output signal of a given value in response to a coincident input of signals of said given value from the two sensing means and a signal of said given value from the control means;

a first inverter for inverting the output signal of the first AND gate;

an OR gate capable of producing an output signal of said given value in response to an input signal of said given value from either of the two sensing means;

a second AND gate capable of producing an output signal of said given value in response to a coincident input of a signal of said given value from the OR gate and an additional signal of said given value;

a second inverter for inverting the output of the second AND gate;

a third AND gate capable of producing an output signal of said given value in response to a coincident input of a signal of said given value from the first inverter and an additional signal of said given value from the second inverter; and a third inverter for inverting the output signal of the third AND gate, the output of said third inverter providing a clock signal, and also being applied to the second AND gate to provide said additional signal of said given value, whereby a clock signal is produced by said third inverter in response to a predetermined combination of control signal and timing signals.

3. A device for producing clock signals from a record medium being sensed, comprising, in combination, a first and second sensing means capable of sensing the presence of regularly spaced timing indicia in said record medium and producing timing signals in response to the indicia sensed;

a first OR gate capable of producing an output control signal of a given value for controlling the operation of the device, in response to an input signal of said given value on any one of a plurality of individual control signal input means;

a bistable element having output signal means and two input signal means and capable of producing an output signal in response to a change in input signal on the input signal means on which the last signal change did not appear;

a monostable element having its input connected to the output means of the bistable element and capable of producing a clock signal in response to a change in input signal;

an AND gate capable of producing an output signal of said given value in response to a coincident input of signals of said given value from the two sensing means and a control signal of said given value from the first OR gate;

means for inverting the output signal of the AND gate and applying the inverted signal to one of the input signal means of the bistable element; and a second OR gate capable of applying an output signal of said given value to the other of the two input signal means of the bistable element in response to an input signal of said given value from either of the two sensing means, whereby the bistable element is controlled according to a predetermined combination of control signal and timing signals to, in turn, control the monostable element to cause said monostable element to produce a clock signal.

4. A device for producing clock signals from a record medium being sensed, comprising, in combination, first and second sensing means capable of sensing the presence of regularly spaced timing indicia in said record medium and producing timing signals in response to the indicia sensed;

control means to provide a control signal for controlling the operation of the device;

a bistable element having output signal means and two input signal means and capable of producing an output signal in response to a change in input signal on the input signal means on which the last signal change did not appear;

an AND gate capable of producing an output signal in response to a coincident input of timing signals from the two sensing means and a control signal from the control means;

means for inverting the output signal of the AND gate and applying the inverted signal to one of the input signal means of the bistable element; and an OR gate capable of applying an output signal to the other of the two input signal means of the bistable element in response to an input signal from either of the two sensing means, whereby the bistable element is controlled according to a predetermined combination of control signal and timing signals to produce an output signal which may be utilized as a clock signal.

5. A device for producing clock signals from a record member being sensed, comprising, in combination, first and second record member-sensing means, capable of producing signals represented by A and B;

means to provide at least one control signal represented by C;

a bistable element having output signal means and two input signal means and capable of producing an output signal in response to a change in input signal on the input signal means on which the last signal change did not appear;

a monostable element having its input connected to the output of the bistable element and capable of producing an output signal in response to a change in input signal to said monostable element;

first means capable of supplying a signal $f$ to one of the input means of the bistable element in accordance with the Boolean expression $f=(ABC)'$; and second means capable of supplying a signal $f'$ to the other of the input means of the bistable element in accordance with the Boolean expression $f'=A+B$.

6. A logical circuit for producing an output signal in response to a predetermined combination of input signals, comprising, in combination, means capable of producing signals represented by A and B;

means to provide a further signal represented by C;

a bistable element having output signal means and two input signal means and capable of producing an output signal in response to a change in input signal on the input signal means on which the last signal change did not appear;

first means capable of supplying a signal $f$ to one of the input means of the bistable element in accordance with the Boolean expression $f=(ABC)'$; and second means capable of supplying a signal $f'$ to the other of the input means of the bistable element in accordance with the Boolean expression $f'=A+B$.

References Cited in the file of this patent

UNITED STATES PATENTS

| | | |
|---|---|---|
| 2,211,320 | Efron | Aug. 13, 1940 |
| 2,285,296 | Maul | June 2, 1942 |
| 2,685,082 | Beaman et al. | July 27, 1954 |
| 2,792,991 | Di Cambio | May 21, 1957 |
| 2,840,305 | Williams et al. | June 24, 1958 |

OTHER REFERENCES

Arithmetic Operations in Digital Computers (Richards), D. Van Nostrand Co., 1955 (p. 112 relied on).

UNITED STATES PATENT OFFICE

CERTIFICATE OF CORRECTION

Patent No. 3,067,934 December 11, 1962

Gene L. Amacher et al.

It is hereby certified that error appears in the above numbered patent requiring correction and that the said Letters Patent should read as corrected below.

Column 7, line 12, after "154," insert -- and --; line 17, for '"black"' read -- "back --; column 10, lines 63 and 64, for "element" read -- elements --; column 11, line 21, for "Further" read -- Furthermore --; column 14, line 28, strike out "a".

Signed and sealed this 25th day of June 1963.

(SEAL)
Attest:

ERNEST W. SWIDER
Attesting Officer

DAVID L. LADD
Commissioner of Patents